US008856042B2

(12) United States Patent
Deguchi et al.

(10) Patent No.: US 8,856,042 B2
(45) Date of Patent: Oct. 7, 2014

(54) METHOD, APPARATUS AND PROGRAM FOR PERFORMING PERSONAL AUTHENTICATION AND INPUTTING OPERATION INSTRUCTION ON THE BASIS OF BIOMETRIC INFORMATION INCLUDING POSTURE INFORMATION

(75) Inventors: Shigeru Deguchi, Maebashi (JP); Tsuyahiko Shimada, Maebashi (JP); Kazuya Ogawa, Maebashi (JP)

(73) Assignee: Fujitsu Frontech Limited, Tokyo (JP)

( * ) Notice: Subject to any disclaimer, the term of this patent is extended or adjusted under 35 U.S.C. 154(b) by 106 days.

(21) Appl. No.: 12/911,510

(22) Filed: Oct. 25, 2010

(65) Prior Publication Data
US 2011/0106700 A1 May 5, 2011

(30) Foreign Application Priority Data

Oct. 30, 2009 (JP) ................. 2009-250049

(51) Int. Cl.
*G06Q 40/00* (2012.01)
*G07C 9/00* (2006.01)
*G06Q 20/10* (2012.01)

(52) U.S. Cl.
CPC ........ *G07C 9/00158* (2013.01); *G07C 2209/65* (2013.01); *G06Q 20/1085* (2013.01)
USPC ............... 705/43; 705/41; 382/190; 382/224; 382/116; 382/124; 235/379; 345/173; 345/172; 283/67; 340/5.83; 716/186

(58) Field of Classification Search
USPC .............. 705/30–45; 382/190, 224, 116, 124, 382/115; 235/379; 345/173, 172; 283/67; 340/5.83; 716/186
See application file for complete search history.

(56) References Cited

U.S. PATENT DOCUMENTS 5,974,163 A * 10/1999 Kamei .......................... 382/125
6,241,288 B1 * 6/2001 Bergenek et al. ................ 283/67
(Continued)

FOREIGN PATENT DOCUMENTS

| JP | 61-253580 | 11/1986 |
| JP | 2004-295653 | 10/2004 |

(Continued)

OTHER PUBLICATIONS

Japanese office action issued in corresponding Japanese App. No. 2009-250049, mailed Apr. 23, 2013 (with full English translation).

(Continued)

*Primary Examiner* — Tien Nguyen
(74) *Attorney, Agent, or Firm* — Greer Burns & Crain Ltd.

(57) ABSTRACT

A method includes obtaining an image to be compared at the time of use which is intended for comparing biometric information at the time of use of a user, obtaining posture information at the time of use which indicates a posture when biometric information at the time of use of the user is shot, performing personal authentication for the user by comparing the image to be compared at the time of use with a preregistered image to be compared at the time of registration of the user, and inputting an operation instruction corresponding to operation information preregistered in association with posture information at the time of registration which is determined to match, by comparing the posture information at the time of use with a plurality of pieces of preregistered posture information at the time of registration of the user.

9 Claims, 15 Drawing Sheets

(56) References Cited

U.S. PATENT DOCUMENTS

| | | | | |
|---|---|---|---|---|
| 6,799,275 | B1* | 9/2004 | Bjorn | 713/186 |
| 6,886,096 | B2* | 4/2005 | Appenzeller et al. | 713/170 |
| 7,728,902 | B2* | 6/2010 | Kishigami et al. | 348/340 |
| 7,853,055 | B2* | 12/2010 | Machida | 382/124 |
| 8,447,077 | B2* | 5/2013 | Benkley et al. | 382/124 |
| 2004/0064415 | A1* | 4/2004 | Abdallah et al. | 705/50 |
| 2004/0190776 | A1* | 9/2004 | Higaki et al. | 382/190 |
| 2006/0038006 | A1* | 2/2006 | Katsumata et al. | 235/380 |
| 2007/0098223 | A1* | 5/2007 | Kamata et al. | 382/115 |
| 2007/0177807 | A1* | 8/2007 | Enomoto | 382/224 |
| 2008/0041939 | A1* | 2/2008 | Higashiura et al. | 235/380 |
| 2008/0192989 | A1 | 8/2008 | Asano et al. | |
| 2009/0230183 | A1* | 9/2009 | Iida | 235/379 |

FOREIGN PATENT DOCUMENTS

| | | |
|---|---|---|
| JP | 2007-148724 | 6/2007 |
| JP | 2007-334604 | 12/2007 |
| JP | 2008-197712 | 8/2008 |
| JP | 2008-250601 | 10/2008 |
| JP | 2009-116485 | 5/2009 |
| JP | 2009-230692 | 10/2009 |

OTHER PUBLICATIONS

Japanese office action issued in corresponding Japanese App. No. 2009-250049, mailed Aug. 6, 2013 (with full English translation).

* cited by examiner

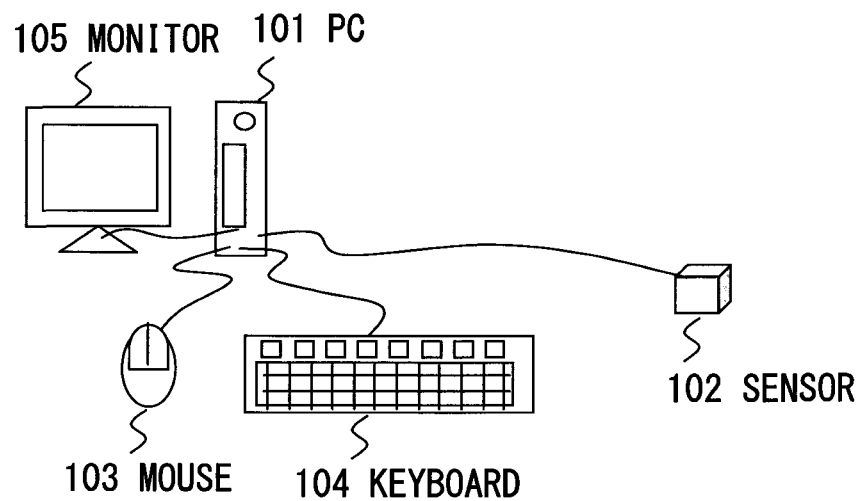
F I G. 1

POSITION INFORMATION

ROTATION INFORMATION

PITCHING

ROTATION INFORMATION

ROLLING

ROTATION INFORMATION

YAWING

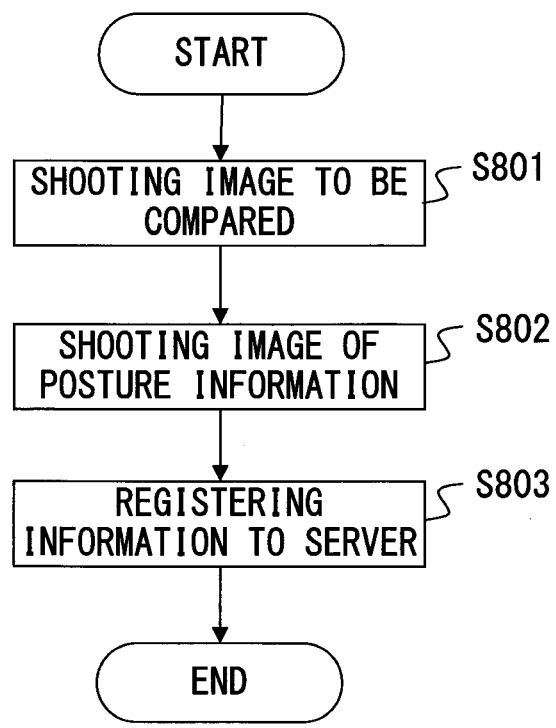
F I G. 8

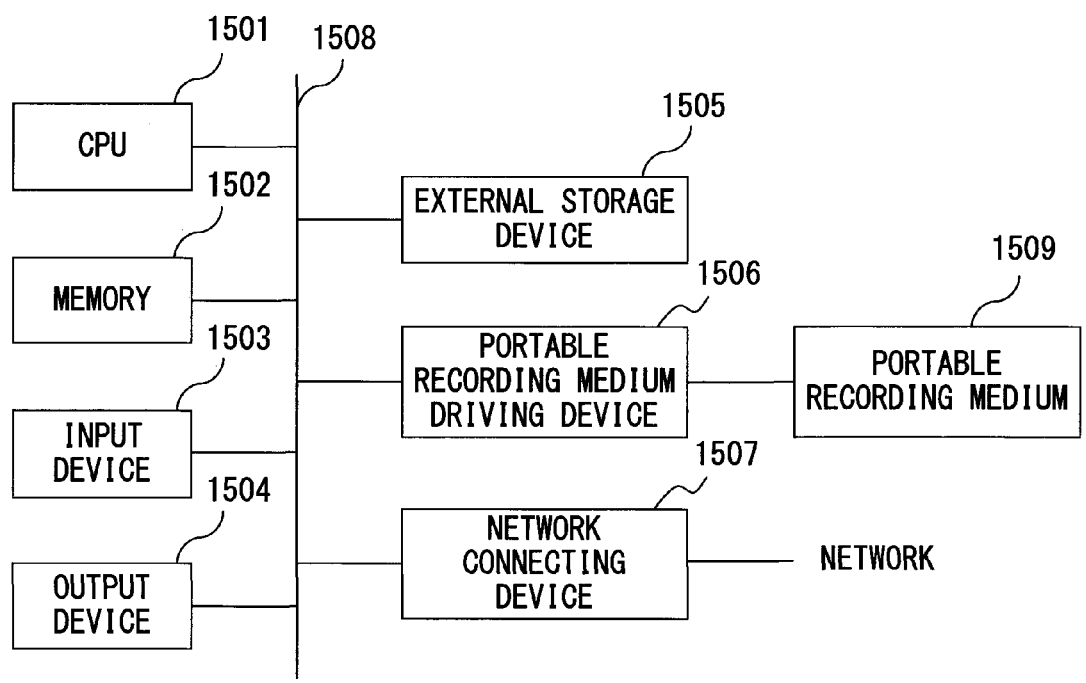
F I G. 15

METHOD, APPARATUS AND PROGRAM FOR PERFORMING PERSONAL AUTHENTICATION AND INPUTTING OPERATION INSTRUCTION ON THE BASIS OF BIOMETRIC INFORMATION INCLUDING POSTURE INFORMATION

CROSS-REFERENCE TO RELATED APPLICATIONS

This application is based upon and claims the benefit of priority from prior Japanese Patent Application No. 2009-250049 filed in Oct. 30, 2009, the entire contents of which are incorporated herein by reference.

1. Technical Field

The present invention relates to a personal authentication/operation instruction input technique based on obtainment of biometric information.

2. Background Art

Techniques for performing personal authentication and inputting an operation instruction by recognizing biometric information have been popularized in recent years.

Biometric information is unique to each person, and a maximum number of pieces of information that can be registered is determined. For example, there are two palms for each person, the right and the left hand palms, there are two irises for each person, those in the right and the left eyes, and there are approximately 10 fingers (fingerprints or veins). Here, there are cases where a user is caused to select a desired operation from among many operations after personal authentication is performed for the user in a certain business system or the like.

An example is a case where a user logs on to any of a plurality of accounts (such as that of an administrator, a user, or the like) of a computer depending on his or her need when the user registers the accounts. Another example is a case where a user uses any of a plurality of accounts in one financial institution depending on his or her need when he or she has the accounts. A further example is a case where a door key is opened/closed. A still further example is a case where operations such as clocking-in, clocking-out, temporary leave and the like are registered in attendance management.

As described above, a technique for recognizing biometric information (such as a combination of the right and the left hands) a plurality of times exists as a first conventional technique for performing personal authentication and inputting a specification of a plurality of operations.

Additionally, a second conventional technique is known wherein a lock is released if authentication based on IC tag authentication or a similar authentication other than biometric information is successfully performed and an authentication based on posture information attained from an image data match is performed.

PATENT DOCUMENTS

Patent Document 1: Japanese Laid-open Patent Publication No. 2008-250601
Patent Document 2: Japanese Laid-open Patent Publication No. 2007-334604

SUMMARY OF THE INVENTION

However, the above described first conventional technique has a problem in that a lot of time is required until all of the biometric information is recognized, which imposes a heavy load on a user.

Additionally, the above described second conventional technique has a problem in that, since authentication based on information other than biometric information is required, the system becomes complicated, and a user is forced to make preparations (such as holding an IC tag, remembering a PIN number, and the like) for authentication based on information other than biometric information, leading to an inconvenience.

Accordingly, an object in one aspect of the present invention is to enable personal authentication to be performed and to enable one operation instruction to be input among many operations by performing authentication on the basis of biometric information only once.

One embodiment of the present invention is implemented as a method for performing personal authentication and inputting an operation instruction on the basis of biometric information, and has the following configuration.

Initially, an image to be compared at the time of use which is intended for comparing biometric information at the time of use of a user is obtained.

Next, posture information at the time of use which indicates a posture when the biometric information at the time of use of the user is shot is obtained.

Then, personal authentication is performed for the user by comparing the image to be used at the time of use with a preregistered image to be compared at the time of registration of the user.

Next, the posture information at the time of use is compared with a plurality of pieces of preregistered posture information at the time of registration of the user, thereby inputting an operation instruction corresponding to operation information which is determined to match that was preregistered in association with posture information at the time of registration.

According to the present invention, it is possible to increase the number of types of operations that can be selected with biometric authentication performed at one time.

Additionally, according to the present invention, it is possible to make authentication unsuccessful if posture information does not match even if biometric information has been stolen by a theft or the like of image information. As a result, the safety of authentication and an operation instruction input can be enhanced.

Furthermore, according to the present invention, by causing a user to hold his or her palm over a sensor and to enact a predetermined posture in an operation of an ATM, complicated personal authentication and operation instruction of the ATM can be performed at one time. As a result, convenience for users can be dramatically improved.

Still further, according to the present invention, it becomes possible to easily register an instruction to perform a predetermined operation upon enacting a desired posture of a palm by a user in an operation of an ATM.

BRIEF DESCRIPTION OF THE DRAWINGS

FIG. 1 illustrates an entire configuration of a first embodiment according to the present invention;

FIG. 8 is a flowchart illustrating control operations of a registration terminal device in the second embodiment;

FIG. 15 illustrates an example of a hardware configuration for implementing each of the embodiments.

DESCRIPTION OF THE PREFERRED EMBODIMENTS

Embodiments for implementing the present invention are described in detail below with reference to the drawings.

The embodiments described below refer to a case of using palm vein authentication. Posture information of a target at the time of shooting is obtained at the same time as images to be compared of the shape of a palm and the position and the shape of a vein are obtained by shooting the palm that is held over a sensor for personal authentication. For example, in palm authentication, the posture information indicates the position and the tilt of a shot palm. By combining personal authentication and the posture information, a process executed by a user at the time of use can be branched to inputs of many operation instructions simultaneously with the authentication. Since the number of times of authentication is only one, a burden on a user can be lightened.

For practical purposes, by for example only changing a shooting position and a tilt of a palm when a user registers a plurality of log-on accounts (such as an administrator privilege, a user privilege, and the like) of a computer, he or she can easily log on to each of the accounts.

Additionally, if for example a user has a plurality of accounts in one financial institution, he or she can use any of the accounts that depend on posture information.

Alternatively, a user can for example set the opening/closing of a door key to "close with authentication if the palm is tilted to the right", "open with authentication if the palm is tilted to the left", or the like.

Furthermore, in attendance management for example, operations such as clocking-in, clocking-out, temporary leave and the like are respectively associated with particular postures, thereby enabling burdensome button operations to be omitted.

FIG. 1 illustrates an entire configuration of a first embodiment according to the present invention.

The first embodiment is configured by connecting input/output devices such as a sensor 102, a mouse 103, a keyboard 104, and a monitor (display device) 105 to a PC (Personal Computer) 101 that includes a storage device, an arithmetic unit, a control device and the like.

The sensor 102 is used to obtain biometric information of a user for palm vein authentication and posture information at the time of shooting.

Figure 2:
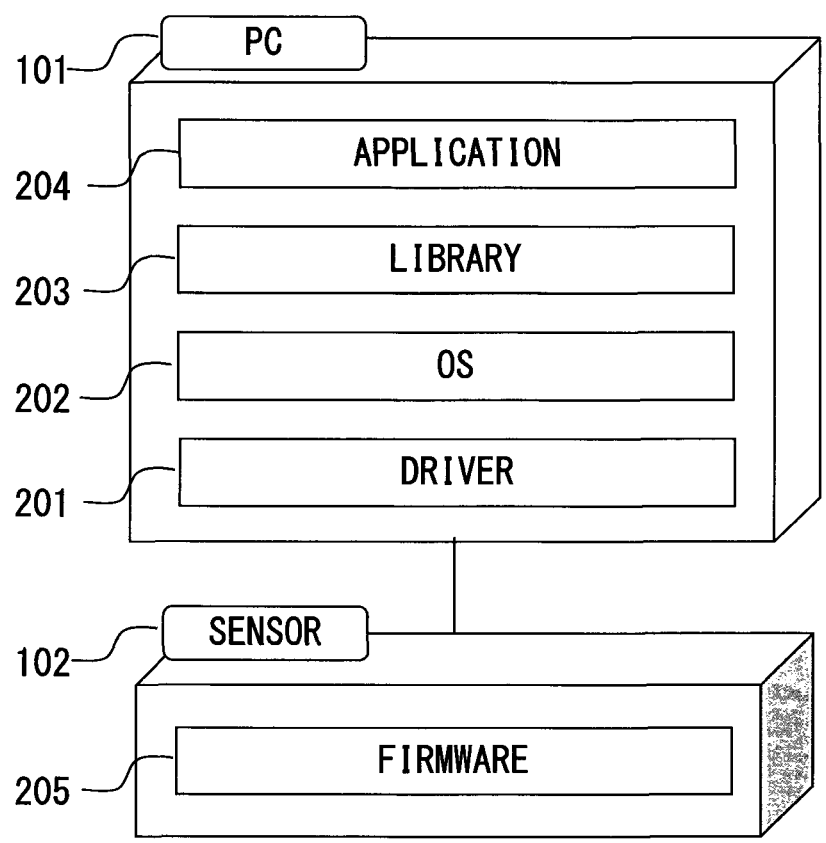
FIG. 2 illustrates a software configuration of the first embodiment.

FIG. 2 illustrates a software configuration of the first embodiment.

The PC 101 includes software such as a driver 201, an OS (Operating System) 202, a library 203, and an application 204. The sensor 102 includes firmware 205.

The firmware 205 implements functions such as a function of controlling operations of the sensor 102, and a function of communicating with the driver 201 within the PC 101.

The OS 202 manages information transfers to the input/output devices such as the sensor 102, the mouse 103, the keyboard 104, the monitor 105, and the like.

The driver 201 mediates a communication between the sensor 102 and the library, assisting the OS 202.

The library 203 calls the driver 201 by request from the application 204, and receives biometric information from the sensor 102. The library 203 has a function of calculating posture information from shot biometric information. The library 203 also has a function of comparing registered biometric information with the shot biometric information.

The application 204 has a function of implementing designs that are displayed on a screen and directly viewed by a user, and for enabling a user to register an operation corresponding to posture information by using the mouse 103 and the keyboard 104.

Figure 3:
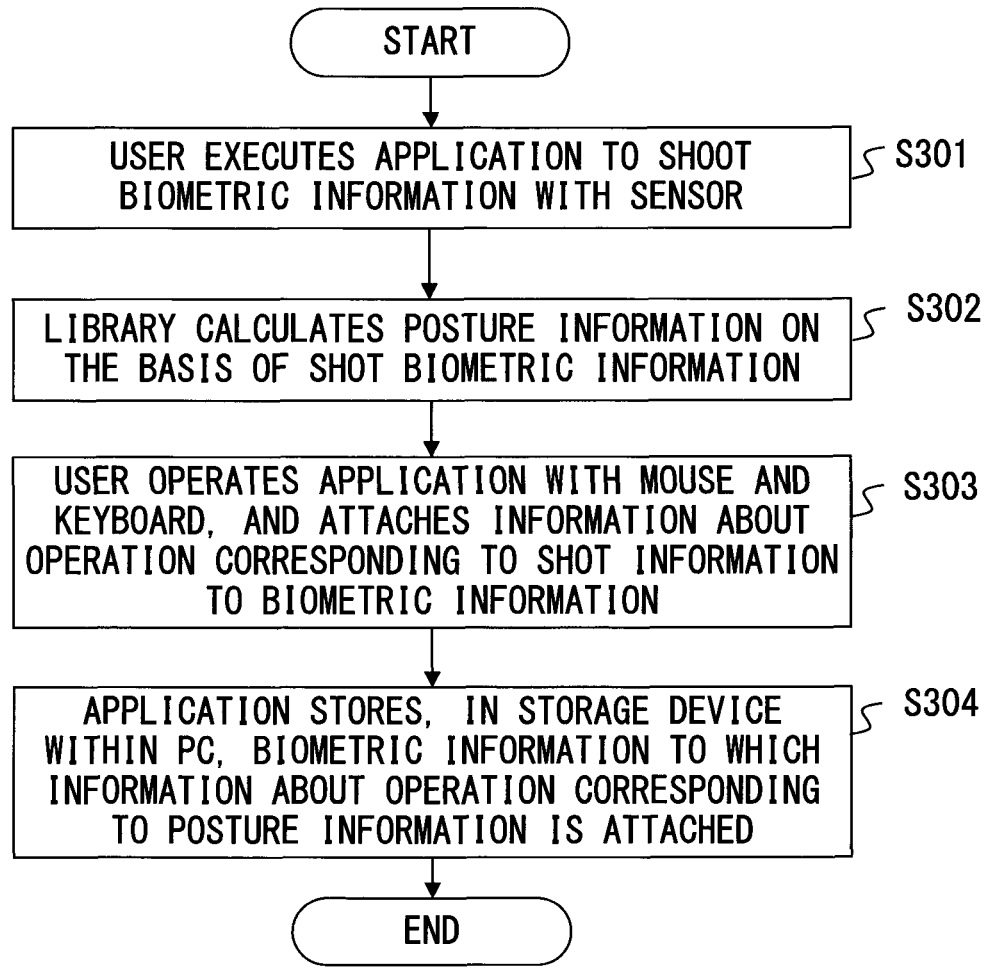
FIG. 3 is a flowchart illustrating control operations of a registration process executed in the first embodiment.

FIG. 3 is a flowchart illustrating control operations of a registration process executed in the first embodiment. The following description is provided with reference to FIGS. 1 and 2 as needed.

A user executes the application 204 to shoot biometric information with the sensor 102 (step S301).

The library 203 calculates posture information on the basis of the shot biometric information (step S302).

The user operates the application 204 with the mouse 103 and the keyboard 104, and attaches, to the biometric information, information about an operation corresponding to the shot information (step S303).

The application 204 stores in a storage device within the PC 101 the biometric information to which the information about the operation corresponding to the posture information is attached (step S304).

Figure 4:
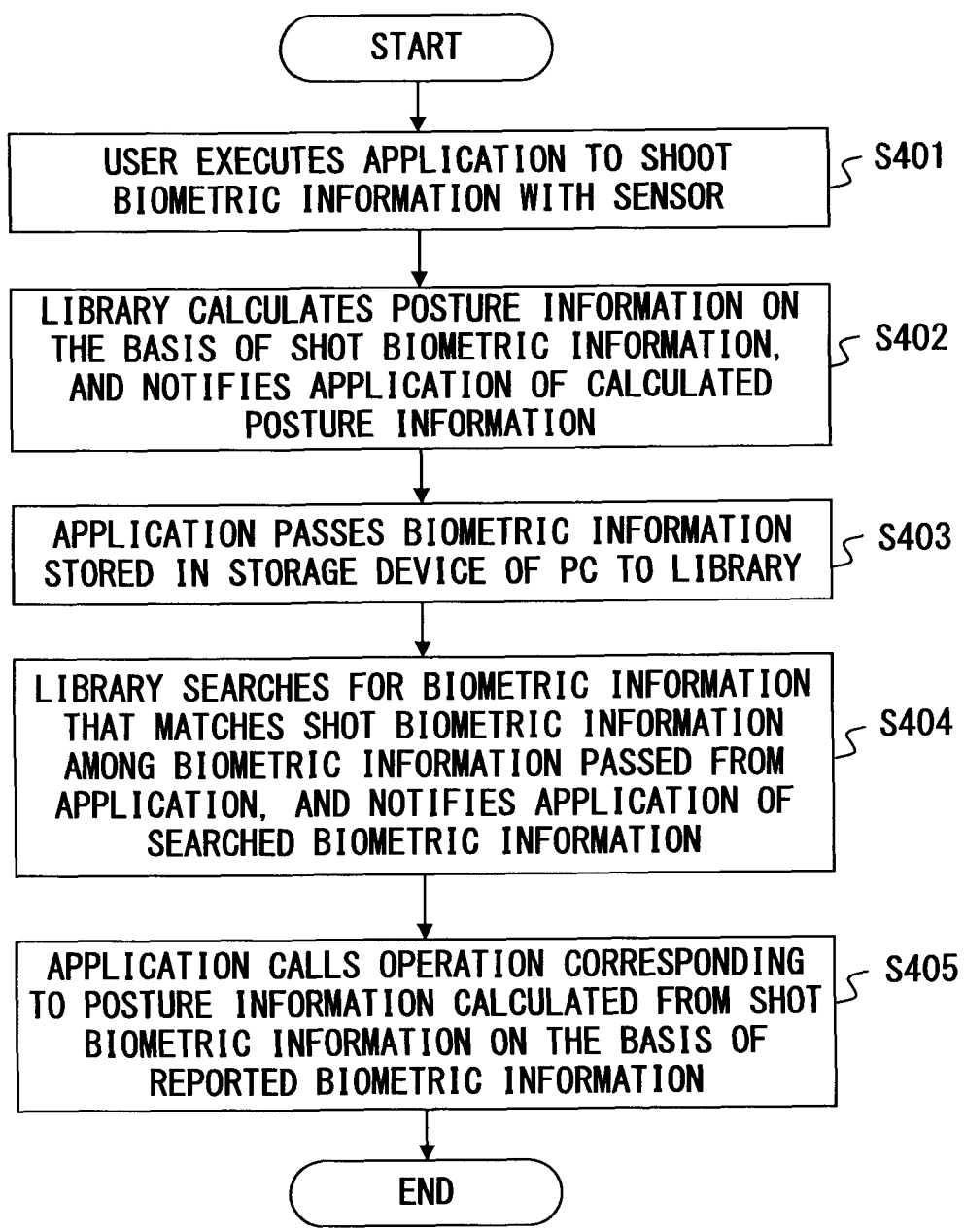
FIG. 4 is a flowchart illustrating control operations of a comparison process executed in the first embodiment.

FIG. 4 is a flowchart illustrating control operations of a comparison process executed in the first embodiment.

The following description is provided with reference to FIGS. 1 and 2 as needed.

Initially, a user activates the application 204 (FIG. 2) to shoot biometric information with the sensor 102 (FIG. 1) (step S401).

The library 203 (FIG. 2) calculates posture information on the basis of the shot biometric information, and notifies the application 204 (FIG. 2) of the calculated posture information (step S402).

The application 204 (FIG. 2) passes biometric information stored in the storage device of the PC 101 (FIG. 1) to the library 203 (FIG. 2) (step S403).

The library 203 (FIG. 2) searches for biometric information that matches the shot biometric information from among the biometric information passed from the application 204 (FIG. 2), and notifies the application 204 (FIG. 2) of the searched for biometric information (step S404).

The application 204 calls for an operation corresponding to the posture information calculated from the shot biometric information on the basis of the reported biometric information (step S405).

Figure 5:
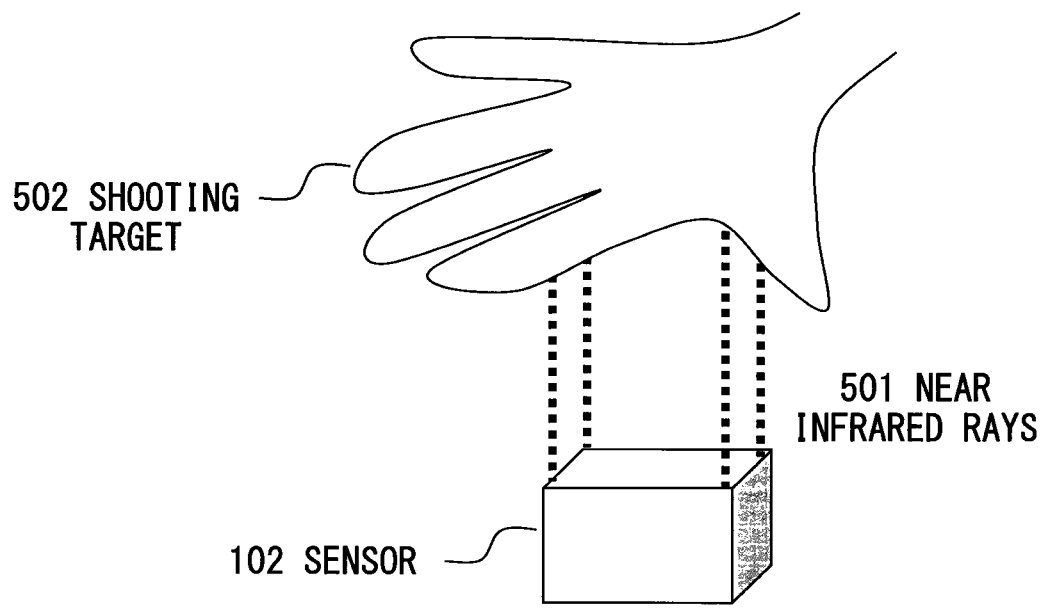
FIG. 5 illustrates an outline of a method for obtaining posture information at the time of shooting.

FIG. 5 illustrates an outline of a posture information obtainment method used at the time of shooting. The sensor 102 (FIG. 1) measures a distance to a shooting target 502 with near infrared rays 501 emitted by the sensor 102 (FIG. 1), whereby posture information illustrated in FIGS. 6A, 6B, 6C and 6D can be calculated.

FIGS. 6A to 6D illustrate the posture information calculated from shot information. Here, the posture information is mainly composed of position information and rotation information.

Figure 6A:
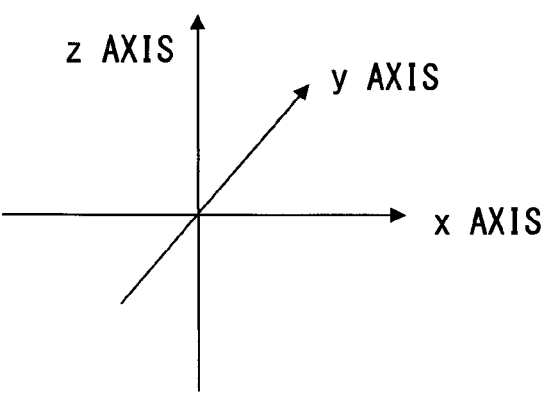
FIGS. 6A to 6D are explanatory views of posture information obtained at the time of shooting.

The position information is information that represents the position of the shooting target 502 (FIG. 5) in an xyz space that centers around the sensor 102 (FIG. 1), as illustrated in FIG. 6A. The position information is composed of three coordinate values such as a position on an x axis coordinate, a position on a y axis coordinate, and a position on a z axis coordinate.

Figure 6B:
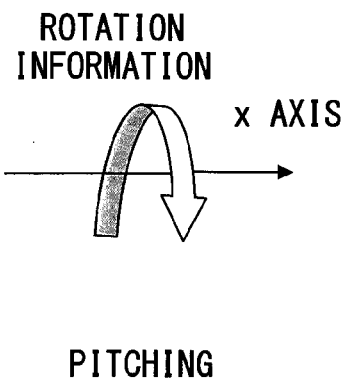
Figure 6C:
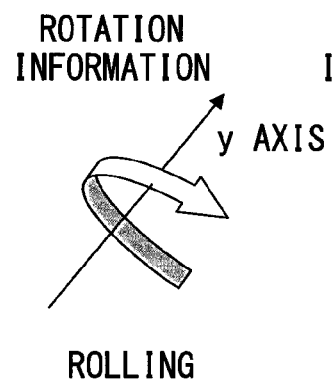
Figure 6D:
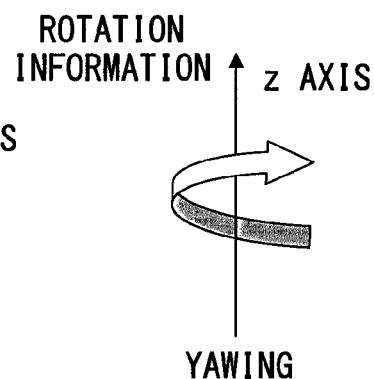

The rotation information is information that represents a rotation about each of the coordinate axes. The rotation information is composed of three types of information, such as pitching, rolling, and yawing. Pitching indicates a rotation about the x axis, as illustrated in FIG. 6B. Rolling indicates a rotation about the y axis, as illustrated in FIG. 6C. Yawing indicates a rotation about the z axis, as illustrated in FIG. 6D.

The above described six types of information (x coordinate value, y coordinate value, z coordinate value, rotation about the x axis, rotation about the y axis, and rotation about the z axis) are used as the posture information at the time of shooting.

According to the above described first embodiment, the number of types of operations that can be selected with biometric authentication performed at one time can be increased. Moreover, even if biometric information is stolen by a theft or the like of image information, authentication can be made unsuccessful if posture information does not match. As a result, safety of authentication and an operation instruction input can be enhanced.

Figure 7:
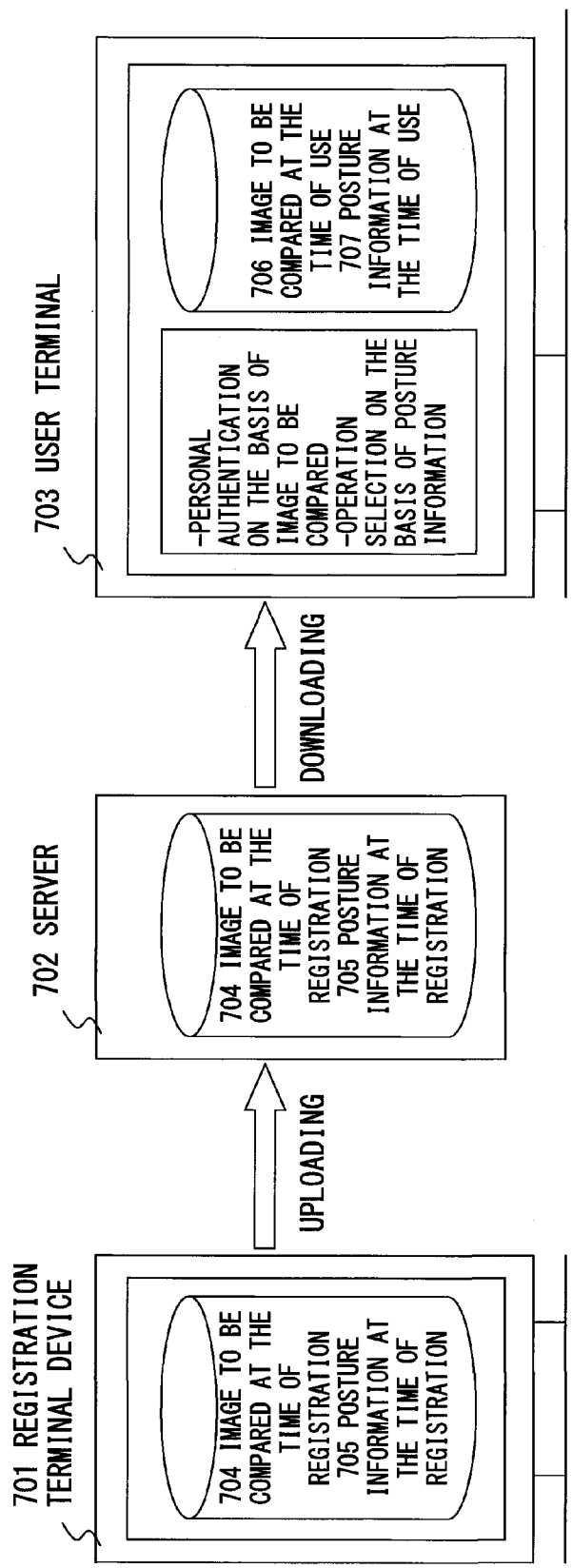
FIG. 7 illustrates a configuration of a second embodiment according to the present invention.

FIG. 7 illustrates a configuration of a second embodiment according to the present invention. This configuration implements a function of performing personal authentication and accepting an operation instruction on the basis of biometric information including posture information in an ATM of a financial institution.

In the second embodiment, a user initially registers an image 704 to be compared at the time of registration and posture information 705 at the time of registration in a registration terminal device 701 such as a terminal device or the like in a branch of a financial institution when he or she starts to use a savings account or the like. The image 704 to be compared at the time of registration and the posture information 705 at the time of registration are uploaded in a server 702 along with user information such as savings account information and the like. When using the user terminal device 703 such as an ATM or the like, the user terminal device 703 executes a process for performing personal authentication on the basis of user information shot with the sensor 102 and for accepting an operation instruction on the basis of posture information that matches the image to be compared at the time of registration by using the image 704 to be compared at the time of registration and the posture information 705 at the time of registration, which are downloaded from the server 702 to the user terminal device 703 in response to an input of the user information.

FIG. 8 is a flowchart illustrating control operations of the registration terminal device 701 in the second embodiment. The following description is provided with reference to FIG. 7 as needed.

When a user starts to use a savings account or the like, his or her image 704 to be compared at the time of registration is initially shot and obtained (step S801).

Next, a posture information image is shot, and posture information 705 at the time of registration is obtained (step S802). This posture information 705 at the time of registration includes also operation information indicating which operation is to be performed.

Then, the image 704 to be compared at the time of registration which is obtained in step S801 and the posture information 705 at the time of registration which is obtained in step S802, are uploaded and registered in the storage device within the server 702 along with user information (step S803).

Figure 9:
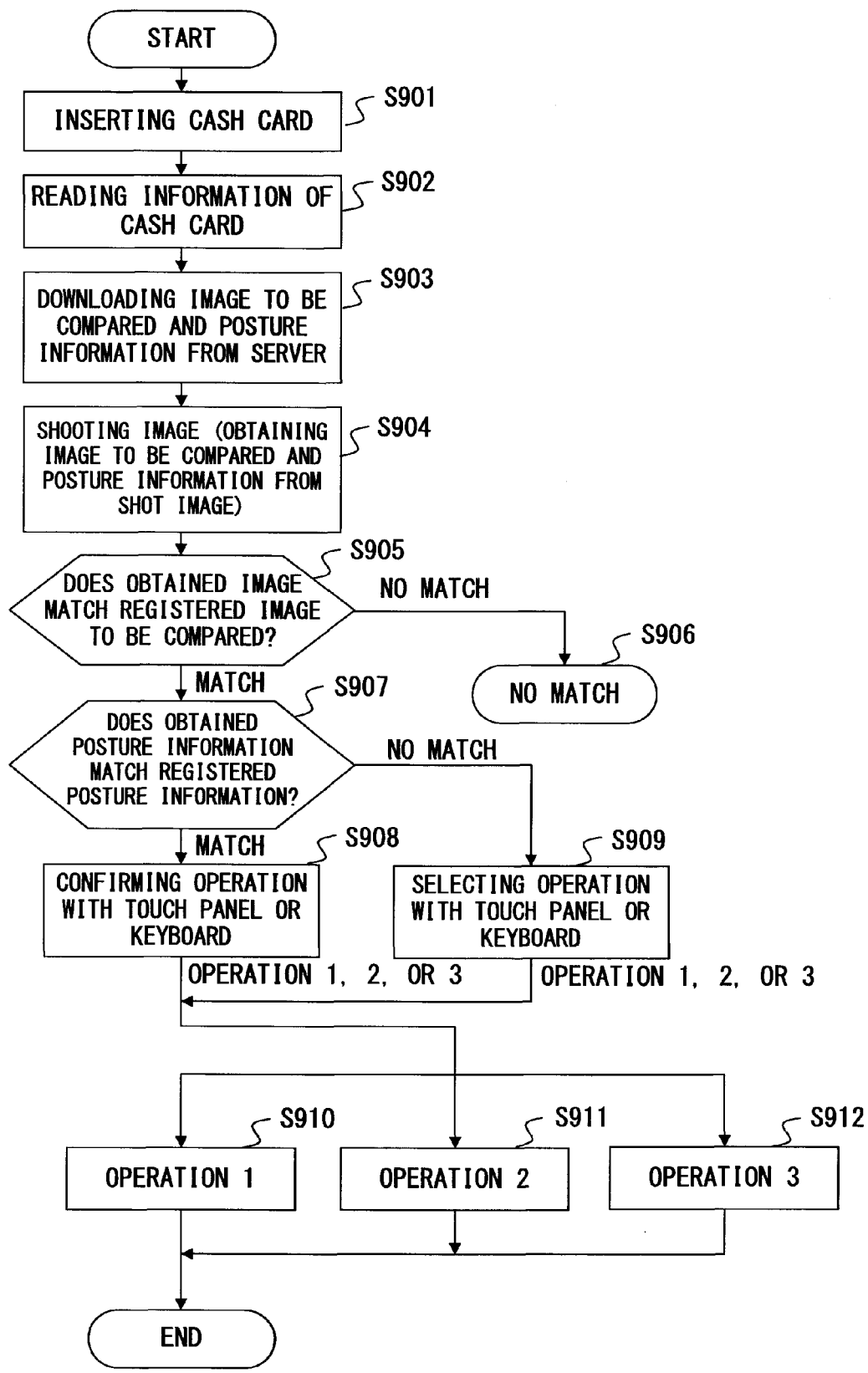
FIG. 9 is a flowchart illustrating control operations of a user terminal device in the second embodiment.

FIG. 9 is a flowchart illustrating control operations of the user terminal device 703 in the second embodiment. The following description is provided with reference to FIG. 7 as needed.

Initially, a user inserts a cash card into a card slot of an ATM. As a result, the slot mechanism performs an insertion operation of the cash card (step S901).

Next, information about the cash card is read as user information (step S902).

Then, the user information is transmitted to the server 702, and from this an image 704 to be compared at the time of registration and posture information 705 at the time of registration, which are stored in association with the user information, are downloaded (step S903).

Next, an image of biometric information is shot, and an image 706 to be compared at the time of use and posture information 707 at the time of use are obtained from the shot image (step S904).

Then, whether or not the image 706 to be compared at the time of use which is obtained from the shot image in step S904 matches the image 704 to be compared at the time of registration downloaded from the server 702 is determined (step S905).

If the two images to be compared are determined to not match in step S905, this result is displayed for the user (step S906).

If the two images to be compared are determined to match in step S905, whether or not the posture information 707 at the time of use which is obtained from the shot image in step S904 matches any of the pieces of the posture information 705 at the time of registration which are downloaded from the server 702 is further determined (step S907).

If the pieces of information are determined to match, the user confirms, with an enter button of a touch panel or a keyboard, an operation corresponding to the posture information 705 at the time of registration which is determined to match (step S908). Then, the operation is performed as any of the processes in steps S910 to 912.

If the pieces of information are determined to not match in step S907, the user selects one operation from among many operation candidates with a touch panel or a keyboard, and confirms the operation with the enter button (step S909). Then, this operation is performed as any of the processes in steps S910 to S912.

In FIG. 9, the three operations 1 to 3 (such as withdrawal, savings, and transfer) are illustrated. However, the number of types of operations is not limited to three.

Figure 13:
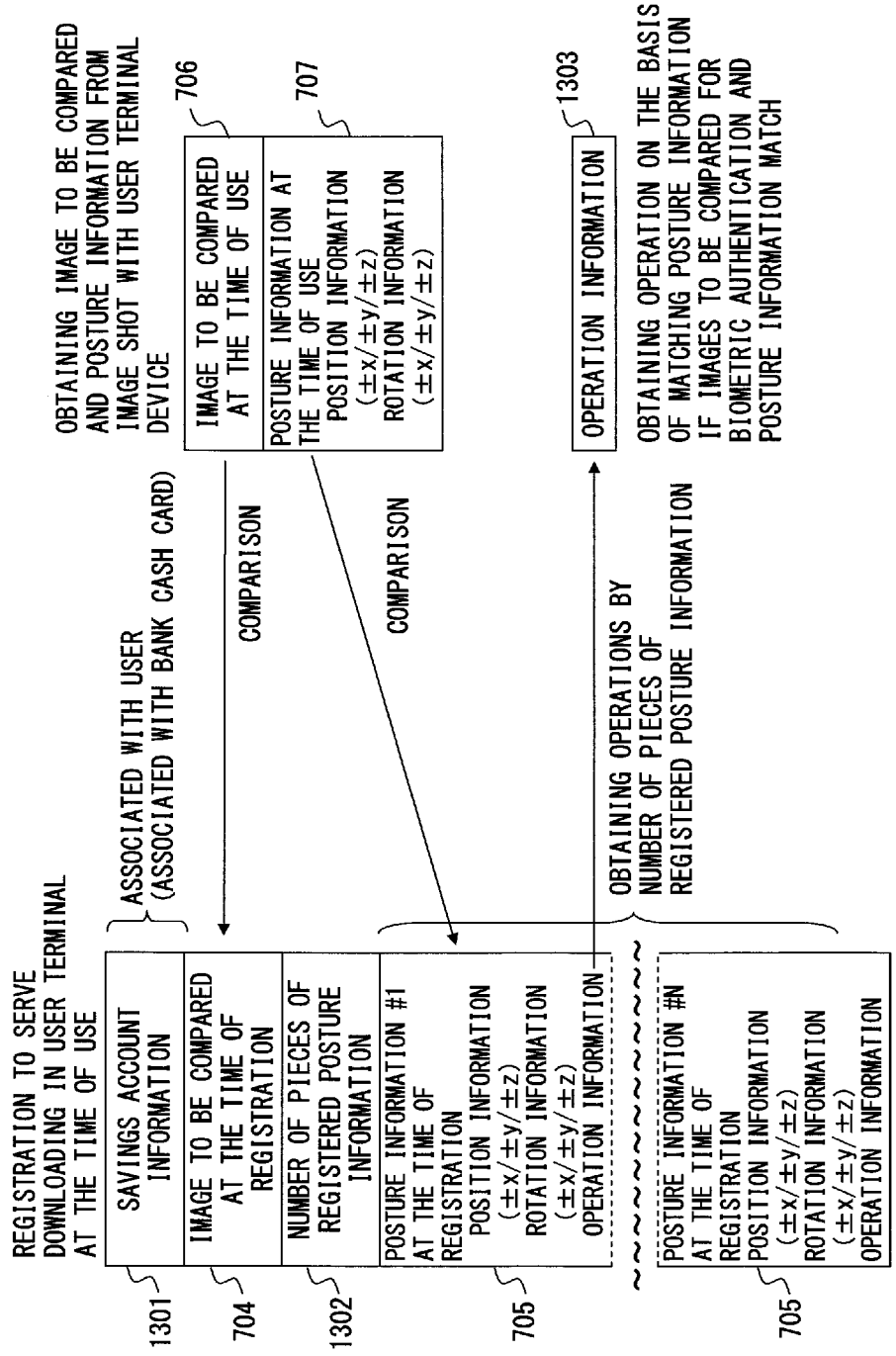
FIG. 13 illustrates an example of a data structure in the second and the third embodiments.

FIG. 13 illustrates an example of a structure of data processed in the second embodiment.

With the above described process in step S803 of FIG. 8, savings account information 1301 consisting of user information made to correspond to a bank cash card, an image 704 to be compared at the time of registration, and posture information 705 #1 to #N at the time of registration, which respectively correspond to a plurality of operations #1 to #N, are stored in the storage device (hard disk or the like) of the server 702.

Additionally, with the process in step S803 of FIG. 8, an operation to be performed in association with a posture is stored in association with each piece of posture information 705 at the time of registration.

Furthermore, the number N of pieces of the posture information 705 at the time of registration is stored as a posture information registered number 1302.

In the meantime, with the above described process in step S904 of FIG. 9, an image 706 to be compared at the time of use and posture information 707 at the time of use are obtained in the user terminal device 703.

Then, with the process in step S905 of FIG. 9, whether or not the image 706 to be compared at the time of use matches the image 704 to be compared at the time of registration which is downloaded from the server 702 and has matching savings account information 1301 is determined.

If the images are determined to match, whether or not the posture information 707 at the time of use matches any of the pieces of the posture information 705 #1 to #N at the time of registration which are downloaded from the server 702 and have matching savings account information 1301 is determined as process in step 907 of FIG. 9.

If the pieces of information are determined to match, an operation corresponding to operation information 1303 downloaded along with the posture information 705 at the time of registration which is determined to match is performed as any of the processes in steps S910 to S912 of FIG. 9.

The posture information 705 at the time of registration and the posture information 707 at the time of use include the position information (±x/±y/±z) (see FIG. 6A) and the rotation information (±x/±y/±z) (see FIGS. 6B to 6D). A set of values (±x/±y/±z) in the position information and the rotation information is a set of values of differences from an image to be compared.

According to the above described second embodiment, a user is caused to merely hold his or her palm over an ATM and to enact a predetermined posture when operating the ATM, whereby a burdensome operation instruction of personal authentication and of the ATM can be issued at one time. This leads to dramatic improvements in convenience for a user.

Figure 10:
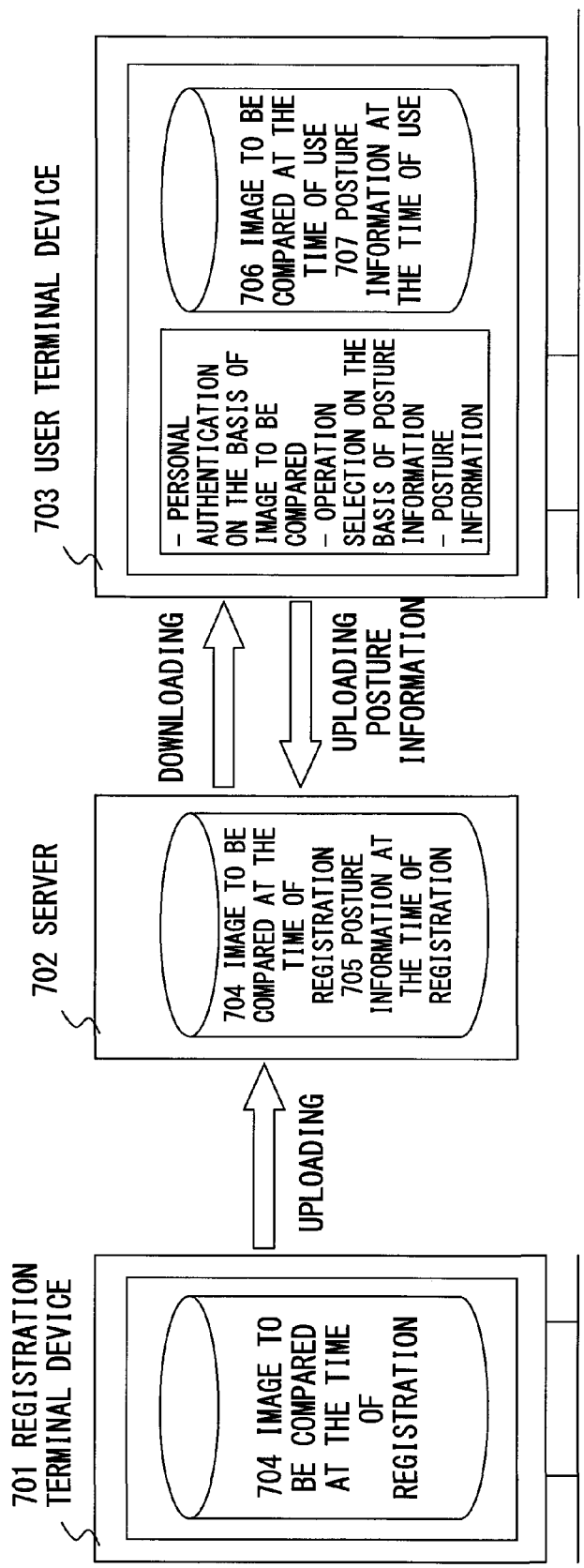
FIG. 10 illustrates a configuration of a third embodiment according to the present invention.

FIG. 10 illustrates a configuration of a third embodiment according to the present invention. Similar to the second embodiment, the third embodiment implements a function of performing personal authentication on the basis of biometric information including posture information, and of accepting an operation instruction on the basis of posture information that matches an image to be compared at the time of registration in an ATM of a financial institution.

The configuration illustrated in FIG. 10 is implemented by including a registration terminal device 701, a server 702, and a user terminal device 703 in a similar manner as in the second embodiment illustrated in FIG. 7.

The configuration illustrated in FIG. 10 is different from that of FIG. 7 in that a user initially registers only an image 704 to be compared at the time of registration in the registration terminal device 701 such as a terminal device or the like in a branch of a financial institution, and the image 704 to be compared at the time of registration is uploaded in the server 702 along with user information such as savings account information and the like when the user starts to use a savings account or the like. In the meantime, the user selects an operation with a touch panel or the like when initially using the operation in the user terminal device 703 such as an ATM or the like, and posture information 707 at the time of use which is obtained when the operation is selected is uploaded in the server 702 as posture information 705 at the time of registration which corresponds to the selected operation that is used thereafter. When using the same operation in the user terminal device 703 such as an ATM or the like, the user can select the operation only by enacting a posture of a palm or the like.

Figure 11:
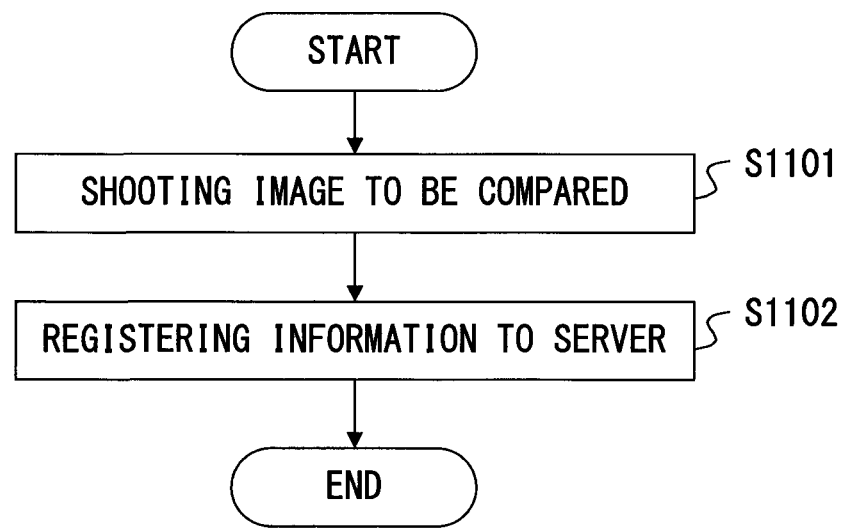
FIG. 11 is a flowchart illustrating control operations of a registration terminal device in the third embodiment.

FIG. 11 is a flowchart illustrating control operations of the registration terminal device 701 in the third embodiment. The following description is provided with reference to FIG. 10 as needed.

In FIG. 11, an image 704 to be compared at the time of registration is initially shot and obtained when a user starts to use a savings account or the like (step S1101).

Then, only the image 704 to be compared at the time of registration which is obtained in step S1101 is uploaded and registered in the storage device within the server 702 along with user information (step S1102).

Figure 12:
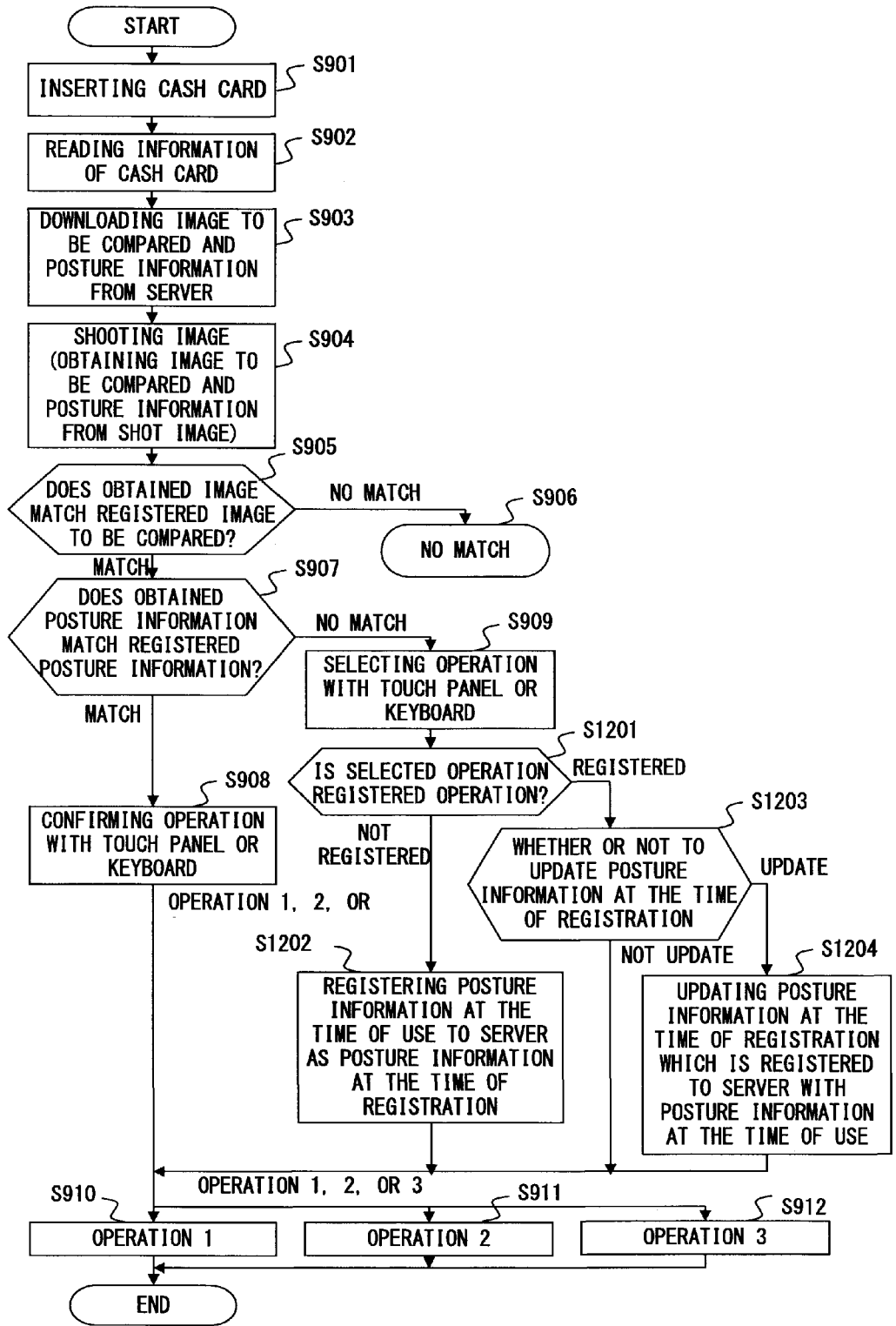
FIG. 12 is a flowchart illustrating control operations of a user terminal device in the third embodiment.

FIG. 12 is a flowchart illustrating control operations of the user terminal device 703 in the third embodiment. The same processes in the flowchart of FIG. 12 as those in the flowchart of FIG. 9 in the second embodiment are denoted with the same step numbers. The following description is provided with reference to FIG. 10 as needed.

In the flowchart illustrated in FIG. 12, processes in steps S901 to S908 are the same as those in the flowchart of FIG. 9 in the second embodiment.

In the downloading process from the server 702 in step S903, posture information 705 at the time of registration has not been obtained yet in some cases.

The process of the flowchart illustrated in FIG. 12 is different from that of FIG. 9 in that the next operation is performed after posture information is determined to not match in step S907 and a user selects and confirms one operation from among many operation candidates with the touch panel or the keyboard in step S909. Namely, whether or not posture information 707 at the time of use of a palm which corresponds to the currently selected operation has been registered is displayed for the user to confirm (step S1201).

If the user confirms that the information has not been registered yet, the posture information 707 at the time of use is uploaded and registered as posture information 705 at the time of registration in the server 702 along with user information in association with the selected operation (step S1202).

As a result, the user can select the operation by merely enacting a posture of the palm when using the same operation thereafter. Then, this operation is performed as any of the processes in steps S910 to 912.

Moreover, if the user confirms that the information has been registered, whether or not to update the posture information at the time of use of the palm which corresponds to the currently selected operation is displayed for the user to confirm (step S1203). If the user confirms not to update the information, this operation is performed as any of the processes in steps S910 to S912.

Alternatively, if the user confirms updating of the posture information 707 at the time of use of the palm which corresponds to the currently selected operation, the posture information 707 at the time of use is uploaded and registered in the server 702 as posture information 705 at the time of registration along with the user information in association with the selected operation (step S1204). Then, this operation is performed as any of the processes in steps S910 to S912.

The above described example of the structure of data processed in the third embodiment is the same as that of FIG. 13 in the second embodiment.

According to the above described third embodiment, a registration for instructing a predetermined operation can be easily made by using a desired posture of a palm of a user in an operation of the user terminal device 703.

Figure 14A:
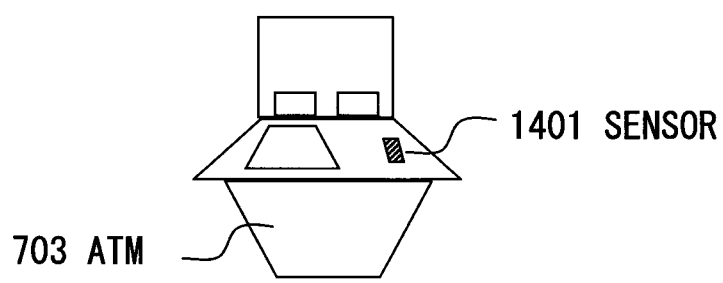
FIGS. 14A and 14B illustrate an example of a configuration of a sensor.
Figure 14B:
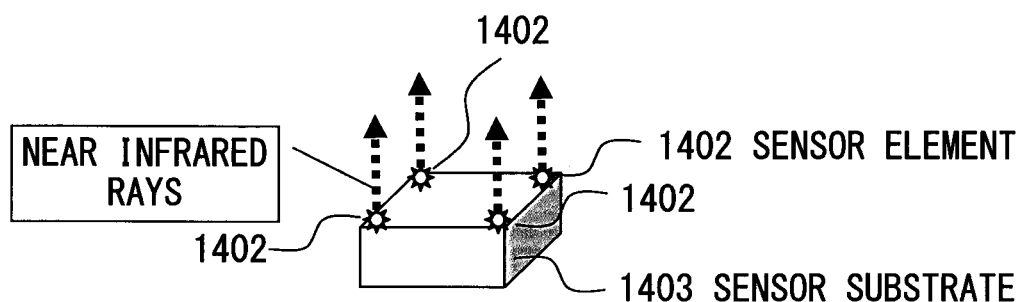

FIGS. 14A and 14B illustrate a structure and a shape of a sensor used in the above described second or third embodiment.

Initially, as illustrated in FIG. 14A, in an ATM that is the user terminal device 703, there is a sensor 1401 for obtaining biometric information of an image to be compared which is obtained by shooting a palm held over the sensor for personal authentication and includes the shape of the palm of a user and the position and the shape of a vein and posture information at the time of shooting, and this sensor is installed, for example, in a right side portion of a console panel of the ATM.

In the sensor 1401, a sensor substrate 1403 is, for example, 3 cm×3 cm in size, and near infrared rays are emitted from a sensor element 1402 installed at each of four corners as illustrated in FIG. 14B.

Normally, the number of sensors 1401 is one. However, a plurality of sensors, for example a total of five sensors installed in a normal position and positions tilted forward, backward, right and left, may be installed. In this case, an image can be obtained without distortion with a tilted sensor even when a hand is tilted, thereby improving extraction accuracy of posture information.

The sensor is intended to shoot palm veins as biometric information for authentication. This is merely one example of sensors that can shoot biometric information, and the sensor is not limited to this configuration. Any sensor is available as long as it can shoot biometric information such as finger veins, a palm print or the like, and posture information.

The above described embodiments can be configured to obtain an image to be compared and to obtain posture information when obtaining an image at one time (in one phase) as a phase for obtaining biometric information and posture information. In this case, another person cannot perform a subsequent operation in place of a legal user after image and information comparisons have been made, leading to improvements in security.

Additionally, in the above described second embodiment, it is possible to register posture information 705 at the time of registration only with the registration terminal device 701, and to select an operation only with posture information 707 at the time of use. In this case, operations available in the user terminal device 703 (ATM) can be limited to each person. For example, one person is permitted not to make a transfer but only to withdraw cash.

FIG. 15 illustrates an example of a hardware configuration of a computer that can implement the functions of the PC 101 (FIG. 1) in the first embodiment, or those of the registration terminal device 701 or the user terminal device 703 in the second or the third embodiment.

The computer illustrated in FIG. 15 includes a CPU 1501, a memory 1502, an input device 1503, an output device 1504, an external storage device 1505, a portable recording medium driving device 1506 into which a portable recording medium 1509 is inserted, and a network connecting device 1507, which are interconnected by a bus 1508. The configuration illustrated in this figure is one example of a computer that can implement the above described system illustrated in this figure. Such a computer is not limited to this configuration.

The CPU 1501 controls the entire computer. The memory 1502 is a memory such as a RAM or the like for temporarily storing a program or data which is stored in the external storage device 1505 (or on the portable recording medium 1509), for example when the program is executed or the data is updated. The CPU 1501 controls the entire computer by reading the program into the memory 1502 and executing the program.

The input device 1503 is composed of, for example, a keyboard, a mouse or the like, and their interface control devices. The input device 1503 detects an input operation that a user performs with the keyboard, the mouse or the like, and notifies the CPU 1501 of a result of the detection.

The output device 1504 is composed of a display device, a printing device or the like, and their interface control devices. The output device 1504 outputs data transmitted in accordance with the control of the CPU 1501 to the display device, the printing device, or the like.

The external storage device 1505 is, for example, a hard disk storage device. The external storage device 1505 is mainly used to store various types of data and programs.

The portable recording medium driving device 1506 accommodates the portable recording medium 1509, which is for example an optical disc, an SDRAM, a compact flash or the like. The portable recording medium driving device 1506 assists the external storage device 1505.

The network connecting device 1507 is a device for connecting a communication line of, for example, a LAN (Local Area Network) or a WAN (Wide Area Network).

Functions of the above described PC 101 (see FIG. 1) in the first embodiment, or those of the registration terminal device 701 or the user terminal device 703 in the second or the third embodiment, are implemented in a way such that the CPU 1501 executes a program for implementing the functions illustrated in the above described flowcharts of FIGS. 3, 4, 8, 9, 11, 12 and the like. The program may be recorded, for example, in the external storage device 1505 or the portable recording medium 1509 and may be distributed. Alternatively, the program may be obtained from a network via the network connecting device 1507.

What is claimed is:

1. A method for performing personal authentication and inputting an operation instruction on a basis of preregistered image of biometric information, at least one preregistered posture information, and at least one preregistered operation information obtained at a time of registration of a user, the method comprising:

obtaining use-time biometric information as a use-time image from the user at a time of use;

obtaining use-time posture information which indicates a posture when the use-time biometric information is taken;

performing personal authentication for the user by comparing the use-time image with the preregistered image; and inputting an operation instruction corresponding to one of the at least one preregistered operation information in association with the at least one preregistered posture information which is determined to match by comparing the use-time posture information with the at least one preregistered posture information; wherein the authentication is unsuccessful when the use-time posture information does not match with any of the at least one preregistered posture information; and the use-time image of the use-time biometric information and the use-time posture information are simultaneously obtained.

2. The method for performing personal authentication and inputting an operation instruction according to claim 1, wherein the at least one preregistered operation information respectively corresponds to the at least one preregistered posture information.

3. The method for performing personal authentication and inputting an operation instruction according to claim 1, wherein
if the use-time posture information does not match any of the at least one preregistered posture information, the use-time posture information and information for identifying an operation instruction selected by the user are respectively registered as a registered posture information and a registered operation information at a time of second registration for the user.

4. The method for performing personal authentication and inputting an operation instruction according to claim 1, wherein
the use-time posture information is obtained after the use-time image of the use-time biometric information is obtained.

5. The method for performing personal authentication and inputting an operation instruction according to claim 1, wherein
the use-time biometric information and the preregistered biometric information are information about a palm vein, and
the use-time image, the preregistered image, the use-time posture information, and the at least one preregistered posture information are obtained with a near infrared ray sensor.

6. The method for performing personal authentication and inputting an operation instruction according to claim 5, wherein
the use-time image, the preregistered image, the use-time posture information, and the at least one preregistered posture information are obtained with a plurality of near infrared ray sensors.

7. An apparatus for performing personal authentication and inputting an operation instruction on a basis of preregistered image of biometric information, at least one preregistered posture information, and at least one preregistered operation information obtained at a time of registration of a user, comprising:
a use-time image obtaining unit for obtaining use-time biometric information as a use-time image from the user at a time of use;
a use-time posture information obtaining unit for obtaining use-time posture information which indicates a posture when the use-time biometric information is taken;
a personal authentication performing unit for performing personal authentication for the user by comparing the use-time image with the preregistered image; and
an operation instruction inputting unit for inputting an operation instruction corresponding to one of the at least one preregistered operation information in association with the at least one preregistered posture information which is determined to match by comparing the use-time posture information with the at least one preregistered posture information; wherein
the authentication is unsuccessful when the use-time posture information does not match with any of the at least one preregistered posture information; and
the use-time image of the use-time biometric information and the use-time posture information are simultaneously obtained.

8. The apparatus for performing personal authentication and inputting an operation instruction according to claim 7, the apparatus being an automated teller machine, further comprising;
a registration information obtaining unit for obtaining, from a server computer connected via a communication line, the preregistered image which corresponds to user information identified with a cash card or credit card inserted by the user, the at least one preregistered posture information, and the at least one preregistered operation information respectively corresponding to the at least one preregistered posture information, wherein
the preregistered biometric information is information about a palm,
the personal authentication performing unit performs personal authentication for the user by comparing the use-time image with the preregistered image obtained by the registration information obtaining unit, and
the operation instruction inputting unit inputs an operation instruction corresponding to one of the at least one preregistered operation information obtained by the registration information obtaining unit in accordance with the at least one preregistered posture information which is determined to match by comparing the use-time posture information with the at least one preregistered posture information which are obtained by the registration information obtaining unit; wherein
the authentication is unsuccessful when the use-time posture information does not match with any of the at least one preregistered posture information.

9. A non-transitory computer-readable medium storing program for causing an apparatus which performs personal authentication and inputs an operation instruction on a basis of preregistered image of biometric information, at least one preregistered posture information, and at least one preregistered operation information obtained at a time of registration of a user, to execute:
a function of obtaining use-time biometric information as an use-time image from the user at the time of use;
a function of obtaining use-time posture information which indicates a posture when the use-time biometric information is taken;
a function of performing personal authentication for the user by comparing the use-time image with the preregistered image; and
a function of inputting an operation instruction corresponding to one of the at least one preregistered operation information in association with the at least one preregistered posture information which is determined to match by comparing the use-time posture information with the at least one preregistered posture information; wherein
the authentication is unsuccessful when the use-time posture information does not match with any of the at least one preregistered posture information; and
the use-time image of the use-time biometric information and the use-time posture information are simultaneously obtained.

* * * * *